(12) United States Patent
Sibrai (10) Patent No.: US 7,142,407 B2
(45) Date of Patent: Nov. 28, 2006

(54) SQUIB DRIVER FOR AIRBAG APPLICATION

(75) Inventor: Andreas Sibrai, Krottendorf (AT)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 219 days.

(21) Appl. No.: 10/828,889

(22) Filed: Apr. 21, 2004

(65) Prior Publication Data

US 2005/0225924 A1    Oct. 13, 2005

(30) Foreign Application Priority Data

Mar. 30, 2004    (EP) ................................. 04392015

(51) Int. Cl.
  *F23Q 5/00*    (2006.01)
  *F23Q 7/00*    (2006.01)
(52) U.S. Cl. ................................. 361/247
(58) Field of Classification Search ................. 361/247
  See application file for complete search history.

(56) References Cited

U.S. PATENT DOCUMENTS

| | | | |
|---|---|---|---|
| 5,309,030 A | | 5/1994 | Schultz ..................... 307/10.1 |
| 5,459,449 A | * | 10/1995 | Ravas et al. ................ 340/438 |
| 5,506,509 A | | 4/1996 | Susak ........................ 324/550 |
| 5,675,278 A | * | 10/1997 | Tanaka et al. ............... 327/333 |
| 5,734,317 A | * | 3/1998 | Bennett et al. ............. 340/436 |
| 5,805,058 A | * | 9/1998 | Saito et al. ................. 340/436 |
| 5,977,651 A | * | 11/1999 | Ueda et al. ................. 307/10.1 |
| 6,456,915 B1 | * | 9/2002 | Fendt et al. ................... 701/45 |
| 2001/0009337 A1 | | 7/2001 | Ueno et al. ................ 307/10.1 |
| 2002/0050826 A1 | | 5/2002 | Boran et al. ................. 324/525 |
| 2002/0125950 A1 | * | 9/2002 | Abe .......................... 330/253 |

FOREIGN PATENT DOCUMENTS

| | | |
|---|---|---|
| DE | 10147884 A | 4/2003 |
| WO | WO 02/26529 A | 4/2002 |

OTHER PUBLICATIONS

Co-pending US Patent, filed Apr. 22, 2004, U.S. Appl. No. 10/830,157, assigned to the same assignee, "Squib Driver for Airbag Application".

* cited by examiner

*Primary Examiner*—Brian Sircus
*Assistant Examiner*—Ann T. Hoang
(74) *Attorney, Agent, or Firm*—Saile Ackerman LLC; Stephen B. Ackerman (57) ABSTRACT

A circuit and a method are given, to realize a very efficient driver device for igniters or squibs as used e.g. in airbag applications. Special attention has been turned to include secure and always reliable operating features into the device and at the same time to reach for a low-cost implementation with modern integrated circuit technologies. Controlled firing operation and sophisticated diagnostic mechanisms are realized. These design features have to a great extent been acquired by consequently using current mirror circuit principles. Current trimming and limitation to secure values are part of the solution.

38 Claims, 7 Drawing Sheets

SQUIB DRIVER FOR AIRBAG APPLICATION

RELATED PATENT APPLICATION

This application is related to U.S. patent application Ser. No. 10/830,157 filed concurrently, and assigned to the same assignee as the present invention. Title: "Low Cost Squib Driver for Airbag Application"

BACKGROUND OF THE INVENTION

1. Field of the Invention

The present invention relates in general to electronic circuits as used within Supplemental Inflatable Restraint (SIR) systems for automotive vehicles and the like, and, more specifically, to semiconductor integrated driver circuits which are employed in such automobile airbag systems for deploying airbags using igniters or squibs; and including a firing control section guaranteeing secure operation under any circumstances and also including circuit diagnostics for testing the proper operation capabilities of the drivers that supply the electrical energy to ignite the squibs.

2. Description of the Prior Art

The main components of Supplemental Inflatable Restraint (SIR) systems for automotive vehicles and generally used as passenger protection systems in motor vehicles include an inflatable textile bag, named airbag, a propellant source (made e.g. from sodium azide pellets), an igniter or squib to initiate burning of the propellant source by means of a firing circuit driving said squib for causing inflation of the airbag. The squib is a detonator wire used for example to ignite the explosive charge that inflates the airbag in the automobile. The squib is a low resistance conductive wire with multiple coatings of an explosive material. At impact during an automobile accident, a large current flows through the squib, heats the wire, and ignites the explosive layers. This initial explosion sets off a secondary charge that inflates the airbag to protect the occupants. Alongside also necessary as another main component is a deployment circuit having at least one accelerometer as crash sensor, sensitive to vehicle motion, especially deceleration, and containing an electronic control module for determining when to deploy the airbag and sending a deployment pulse to the igniter, normally using a microprocessor system monitoring the accelerometer output for evaluating the severity of a crash to determine whether to deploy the airbag. The airbag, propellant, and igniter are by default contained in an airbag module (e.g., within a steering wheel for a driver airbag). The crash or safing sensor can be packaged separately or may be contained within the electronic control module.

This control module performs basic self-diagnostic monitoring of the SIR system each time the system is turned on (e.g., every time a vehicle is started). Any potential performance problems are identified and a warning light e.g. is illuminated on the console, so that the automobile driver knows that the system needs to be serviced. The vehicle battery voltage or ignition system voltage empowering these deployment and firing circuits will, by the way, subsequently be called Airbag Voltage Supply (AVS) voltage. The control circuit and the firing circuit are in general and to a large extent embodied with a microprocessor on an integrated circuit chip for the airbag deployment functionality, altogether called a squib driver. In any case an external harness leads to the squib at the site of the airbag, or in the case the vehicle is equipped with more airbags, this harness connects the squibs of each airbag to the squib driver chip. It is conceivable that eventually some portion of the harness might become damaged, i.e. short to ground (GND) or even to the AVS voltage. To forestall the possibility that such inadvertent electrical connection to the firing circuit might cause deployment of the airbag or disable the whole system, it is desirable to continuously monitor the system to detect any such event. It is common practice to perform diagnostic monitoring of the electrical connection of the squib elements, squib resistances, and electrical leakage or isolation in the squib circuits, among other tests. It is already known to diagnose a short of the firing circuit by feeding a small test current through the squib and through a biasing resistor to ground. The resulting bias voltage will depend on the current and if there are no shorts to the firing circuit the resulting test voltage will be at a prescribed value. To assure this, the test current has to be carefully controlled. Where, for example, if the current is provided by a current source on an integrated circuit, the circuit must be trimmed during manufacture to assure the correct current output. Then the test voltage is sampled by an A/D converter e.g. and fed to the microprocessor where it is monitored to detect a low value indicative of shorting to ground or a high value indicative of shorting to supply voltage. Thus the monitoring circuit in the automobile continuously checks the squib resistance and reports values outside the acceptable range as a warning.

Preferred prior art circuits obeying to automotive industry regulations do not allow a direct galvanic connection of the squib to the supply voltages—neither to the AVS voltage nor to GND voltage with possible firing current flowing—during normal operation of the vehicle, i.e. not firing the squib, and therefore include two separate switches on every side of a squib. This means one high-side switch connects the squib to AVS voltage and another low-side switch connects the squib to GND voltage, thus the deployment of a squib is only initiated if these two independent switches of the firing loop are both closed; the firing loop formed by the vehicle battery between AVS and GND on one side and with said high-side switch, said squib to be fired and said low-side switch on the other side. Currently said squib driver switches are implemented using NPN, NMOS or DMOS transistors, which are controlled as switches by appropriate driver circuits. Due to supply voltage variations and deviations from the normal squib resistance from about 2 Ohms the current through the switches may vary between approximately 2 A and 4.5 A. For integrated squib power transistor switches however the current flowing through these switching devices must be limited to approximately 3 A, therefore it has to be measured and limited during said firing operation and additionally the transistors must be forced to reduce their on-resistance to avoid excessive power dissipation, which could lead to a premature destruction of said semiconductor switching devices. The current practice of sensing this current with resistors causes excess voltage drop that in consequence enlarges the unwanted power dissipation within the integrated power circuit. This disadvantage poses a major problem for that sort of circuits.

Another consequence of the aforementioned automotive industry requirements is the measurement of the isolation of the squib against AVS and GND, and also the determination of the squib resistance, which has to be performed during normal operation of the vehicle. Normal operation means that the squib is not firing. These measuring operations should be periodically performed by applying repeatedly cycling resistance measurements during normal operations of the vehicle. In one aspect, prior art solutions provide a method of testing a high-side driver and a low-side driver in an airbag squib circuit. The airbag squib circuit includes a squib element coupled between the high-side driver and the low-side driver. The high-side driver controllably provides a high-side voltage to one side of the squib element and the low-side driver controllably provides a low-side voltage to the other side of the squib element. Resistance of the squib element is tested for a resistance value laying within a predetermined resistance range. Current leakage associated with said squib element is tested to determine whether it is over a leakage threshold. An intermediate voltage from a weak power supply is supplied to a test-point in the airbag squib circuit between the high-side driver and the low-side driver. One of the drivers is turned on while keeping the other one of the drivers off. Voltage at the test-point is continuously compared with a predetermined voltage range that includes the intermediate voltage. This one driver is turned off in response to the voltage at the test-point being outside the predetermined voltage range, thereby detecting that this one driver is operating properly. If the voltage at the test-point remains in the predetermined voltage range for a predetermined time period, then this one driver is turned off and an indication is made that this one driver has failed.

Unless there is a failure, the other driver is then turned on while keeping the one driver off. A voltage at the test-point is continuously compared with the predetermined voltage range. The other driver is turned off in response to the voltage at the test-point being outside the predetermined voltage range, thereby detecting that the other driver is operating properly. If the voltage at the test-point remains in the predetermined voltage range for the predetermined time period, then the other driver is turned off and an indication is made that the other driver has failed.

In daily use of these circuits in vehicles and especially under all the existing environmental conditions appearing on earth during operation of an automobile another major problem is the degradation of the devices during lifetime and therefore a multitude of techniques and methods for their implementations has been specified in the past.

The main problem hereby is due to the fact, that in most cases the known prior art solutions are very elaborate and complicated when all the requirements as established by the automotive industry have to be met, thereby resulting in practical realizations leading to very costly devices.

Figure 1A:
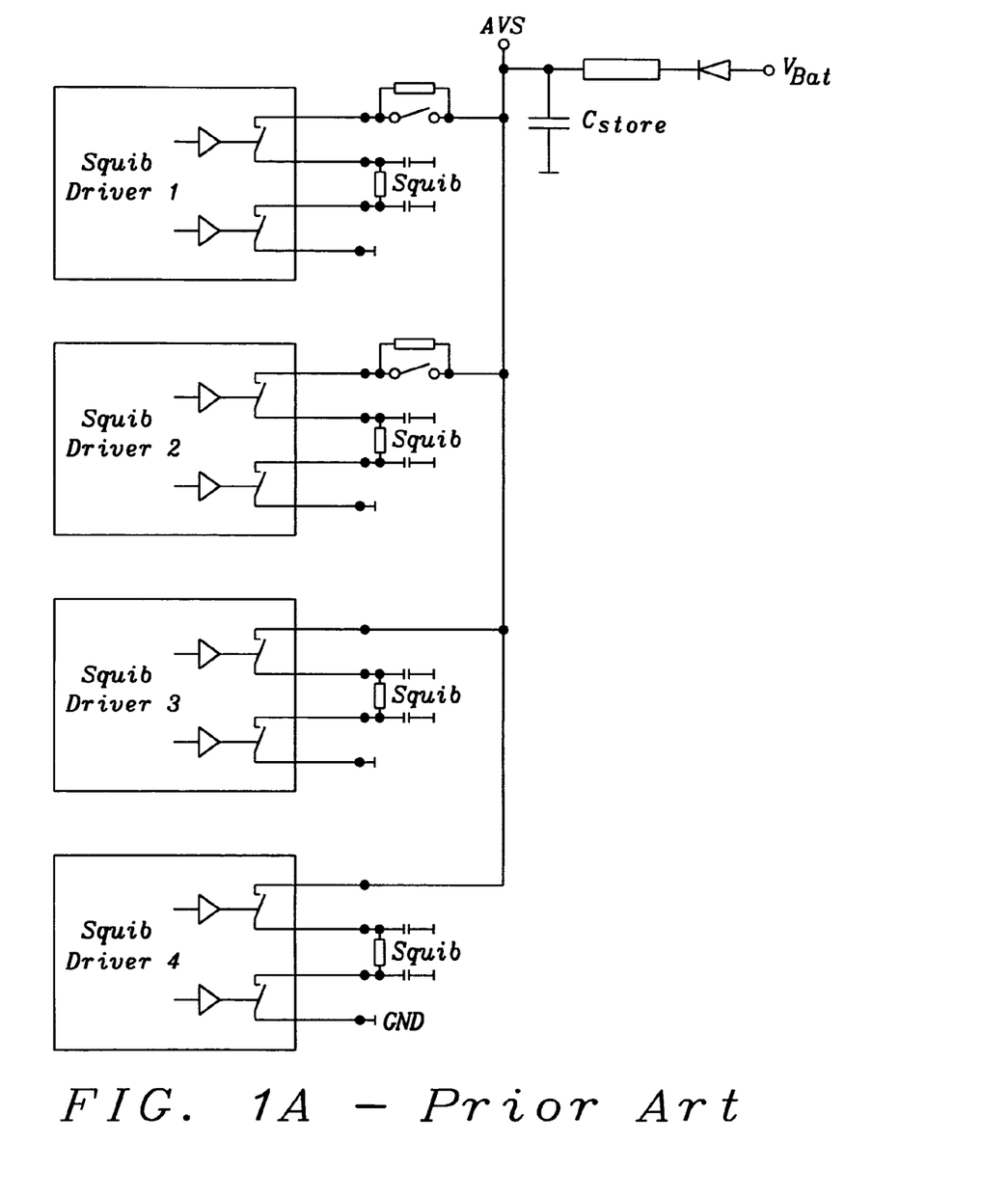
FIG. 1A prior art shows the electrical circuit schematics of a multiple squibs driving circuit, each with two separately driven electronic switches as realization of the prior art.
Figure 1B:
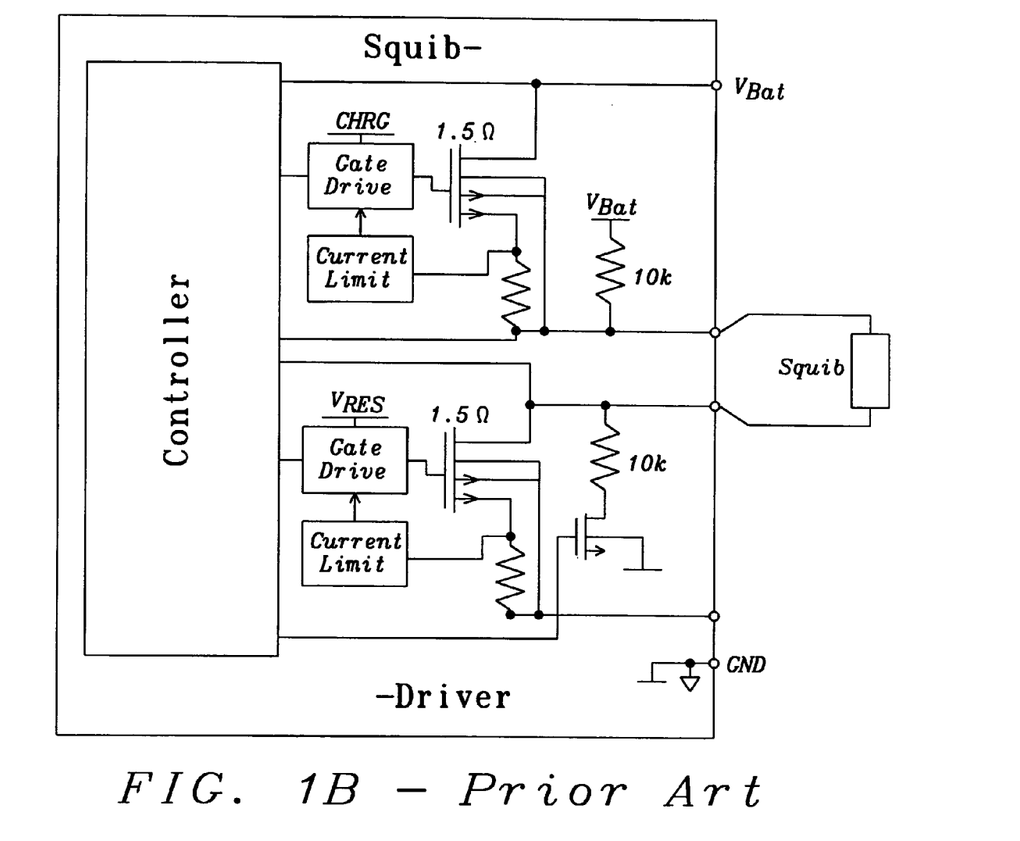
FIG. 1B prior art shows typical electrical circuit schematics for one of the four squib driver circuits of FIG. 1A prior art using two complex FET switches with additional integrated resistors of the prior art.

Realizations of the prior art for such circuits are inter alia implemented as specifically assembled semiconductor circuit systems, consisting of integrated control circuits combined with separate external switching devices or as already customized monolithic integrated circuits, which are however generally of rather high complexity and therefore high cost. FIG. 1A prior art partially shows a typical implementation of a system for airbag applications with $V_{Bat}$, the voltage of the car battery and the AVS supply voltage for the squib drivers, which is generated out of $V_{Bat}$ with the help of a charge pump circuit. FIG. 1B prior art shows a typical realization of one of the four squib driver circuits from FIG. 1A prior art for explanatory purposes with only the squib driving parts and as exemplary prior art circuits for available integrated solutions.

These prior art circuits—which are in every case realized using two electronic switches, high-side and low-side switches connected to the squibs—have several drawbacks, which can especially be seen from the example in FIG. 1B prior art. The FET switches used herein are from a rather sophisticated structure, incorporating an especially enhanced drain, augmented by resistive components for the current measurement and current limitation during testing and firing operations. Furthermore an extra charge pump is needed in order to drive the high-side switch. For the limiting of the maximum driving current these additional resistors are used, which add a voltage drop thus enlarging the power consumption of the circuit. Another disadvantage is, that also for the current limitation a regulation loop is necessary, which can become instable. There are several such expensive solutions available with various patents referring to comparable approaches.

It is therefore a challenge for the designer of such devices and circuits to achieve a high-quality and also low-cost solution. Several prior art inventions referring to such solutions describe related methods, devices and circuits, as well as technologies.

U.S. Pat. No. 5,309,030 (to Schultz et al.) describes a current source for a supplemental inflatable restraint system, where a supplemental inflatable restraint system with a controllable current source comprises a sense element, a switch device coupled to the sense element, and a squib coupled to the switch device, wherein the sense element, switch device and squib are coupled in a series circuit between a power source and a ground. A deploy control circuit is coupled to the switch device, and, in response to a deploy command, forward biases the switch device allowing electric current to flow through the sense element, switch device and squib to deploy a supplemental inflatable restraint. A current control circuit is coupled to the sense element and switch device and responds to the current flow through the sense element and regulates the switch device, effectively limiting current through the series circuit to a predetermined value.

U.S. Pat. No. 5,506,509 (to Susak et al.) discloses a circuit and a method of measuring a squib resistance, where a resistance measuring circuit generates a predetermined reference voltage and impresses that reference voltage across a squib detonation device. The resulting current flowing through the squib is mirrored by a current mirror for providing multiple mirrored currents. The mirrored currents are compared to known current sources. The output signals go high or low depending on whether the mirrored currents are greater than or less than the fixed current sources. The output signals provide an indication as to whether the measured squib resistance is within a specified resistance range. The current sources may be precisely matched to maintain high accuracy in measuring the resistance.

U.S. patent application 2002/0050826 (to Boran et al.) shows and explains high and low side driver tests for airbag modules, wherein a method of testing a high-side driver and a low-side driver in an airbag squib circuit includes preliminary testing of squib resistance and squib leakage for a plurality of trials. Next, one of the drivers is turned on while keeping the other one of the drivers off. A current-limited power supply supplies an intermediate voltage to a squib terminal and the voltage at the terminal is continuously compared with a predetermined voltage range that includes the intermediate voltage. The one driver is turned off in response to the voltage at the point being outside the predetermined voltage range, thereby detecting that the one driver is operating properly. If the voltage at the point remains in the predetermined voltage range for a predetermined time period, then the one driver is turned off and an indication is made that the one driver has failed. If the first driver passed, then the other driver is tested in the same manner.

Although these papers describe circuits and/or methods close to the field of the invention they differ in essential features from the method and especially the circuit introduced here.

SUMMARY OF THE INVENTION

A principal object of the present invention is to realize a very efficient driver device for the firing of igniters or squibs in form of very manufacturable integrated circuits at low cost.

Another principal object of the present invention is to provide an effective and secure method for operating said driver device for igniters or squibs implementable with the help of integrated circuits.

Also another principal object of the present invention is to always secure a controlled firing operation of the igniters or squibs by means of electronic switching devices with controlled current and voltage, i.e. with controlled energy.

Further a principal object of the present invention is to include a secure and continuous surveillance of the igniter or squib devices as well as the electronic switching devices and at the same time guaranteeing, that under no circumstances an unintentional firing operation can occur.

Also an object of the present invention is to include secure and reliable operating features into said driver device and at the same time to reach for a low-cost realization with modern integrated circuit technologies.

Also further an object of the present invention is the inclusion of diagnostic test mechanisms into the circuit and its operation, which includes voltage, current and resistance measurements serving as surveillance of said electronic switches and said squib.

Another further object of the present invention is to combine needed current limitations and said onsite diagnostic tests in one operating function within said electronic switches by an implementation using current mirrors as switching devices.

Further another object of the present invention is to economize the floor space of the chip layout needed for said current mirrors.

Equally an object of the present invention is to eliminate an additional charge pump circuit for the generation of a voltage higher than the main supply voltage of the circuit thus also reducing the number of external components.

Also another further object of the present invention is to avoid additional voltage drop due to said current measurement within said current mirror, thus avoiding additional power loss.

A further object of the present invention is the implementation of said current limiting regulation feature realized without control loop, thus avoiding possible instability of regulation loops.

Also an object of the present invention is thereby to establish an especially adapted method for said resistance measurement of said electronic switch as isolation measurement.

Also another object of the present invention is to resolve with said adapted method for said measuring of said electronic switch resistance also said resistance measurement of said squib.

A still further object of the present invention is to reduce the power consumption of the circuit by realizing inherent appropriate design features, such as trimming and limiting the maximum squib current to its absolutely necessary minimum for a secure firing operation.

Also an object of the invention is therefore to reduce the cost of the system by reducing the size of the external energy storing capacitor, made possible due to said current trimming and limiting.

Another further object of the present invention is to reduce the cost of manufacturing by implementing the circuit as a monolithic integrated circuit in low cost CMOS technology.

Another still further object of the present invention is to reduce cost by effectively minimizing the number of expensive components.

In accordance with the objects of this invention, a new method for the controlled operation and secure firing of igniters or squibs is described, capable of driving the necessary switching devices within a circuit branch connecting said squib via a high-side electronic switch to a power source and via a low-side electronic switch to circuit ground, incorporating separate power supply parts for high voltage and low voltage domains and equipped with elaborate intrinsic diagnostic and online testing features for circuit protection and operation securing purposes, altogether named Squib Driver circuit, comprising the following steps of providing a means for a Control and Test Unit for said Squib Driver circuit, containing a Firing Control (FC) unit and a Diagnostic and Online Test (DOT) unit with input and output connections for—inter alia—an electrical Safing Sensor, a Fuel Cut-Off During Collision operation and a Diagnostic Lamp Driver signal, and further additionally containing measuring or sensing input signals and control output signals; providing for said Squib Driver circuit means for connecting an external main power supply via a mechanical Safing Sensor and means for connecting to ground; providing for said Squib Driver circuit external means for said power supply using a single charge pump circuit for storing said main supply energy within an external storage capacitor as so called AVS voltage; providing for said Squib Driver circuit connection means for connecting an external igniter device or squib to a first connection pin named high-side connection and to a second connection pin named low-side connection; providing a first internal means for switching operations of said external igniter device or squib on its high-side connection point, named high-side switching device; providing a second internal means for switching operations of said external igniter device or squib on its low-side connection point, named low-side switching device; providing another internal means for driving said internal high-side switching device, named high-side driver circuit; providing other internal means for supplying multiple driver currents to said internal high-side driver circuit and/or high-side and low-side switching devices using controllable and switchable current source circuits; providing means for connection of said measuring or sensing input signals from said high-side and low-side switching devices to said Control and Test Unit; providing means for connection of said control output signals from said Control and Test Unit to said controllable and switchable current source circuits for said switch driver circuit and/or for said high-side and low-side switching devices; implementing said high-side switching device with the help of a pair of PMOS transistors in current mirror configuration, thus avoiding the need for an extra and additional charge pump for an AVS excess driving voltage normally needed for operating said high-side switching device; implementing said low-side switching device with the help of a pair of NMOS transistors in current mirror configuration; implementing said high-side driver circuit as a break-through voltage enhanced i.e. stacked—current mirror circuit made up of four driver NMOS-FETs as controlled current source, again controlled by a pair of switchable current sources, whereby the one current source defines the normal diagnostic and test operations and the other current source the firing operation;

implementing for said low-side switching device said controlled pair of switchable current sources as drivers, whereby the one current source defines the normal diagnostic and test operations and the other current source the firing operation; initiating a Basic Function Test Cycle for said Squib Driver circuit during power on of said Squib Driver circuit, testing regular functionality of said internal driver circuits and switches and said external igniter device or squib; starting, in normal operation mode, the Diagnostic and Test Cycle for continuous surveillance of prescribed isolation and resistance values i.e. of the regular functioning of the system; testing for isolation values of the high-side and low-side switching devices versus supply voltage and ground; measuring appropriate test voltages at the squib and said high-side and low-side switching devices in the switched squib branch with the help of given diagnostic currents; calculating the resistance of the squib and said high-side and low-side switching devices in the switched squib branch; evaluating said measured and calculated values and compare to the prescribed and for a regular operation required and defined values; activating in case of failure an alarming signal; calculating with the help of said voltage and resistance values secure firing current values for said high-side and said low-side switching devices, thus trimming, i.e. setting-up said controlled driving currents to their operational necessary minimum, and thus limiting said main supply energy stored within said external storage capacitor to an optimum; continuing the Diagnostic and Test Cycle from its starting point above during normal operation of the Squib Driver circuit; and firing the squib in case of emergency by switching on at the same time, both the high-side and the low-side switching devices and whilst observing given current limitations with the help of said controlled driving currents.

Further in accordance with the objects of this invention, a circuit, implementing said new method is achieved, capable of realizing a driver device for secure and reliable firing of an igniter or squib, connecting said squib via a high-side electronic switch to a power source and via a low-side electronic switch to circuit ground, incorporating separate power supply parts for high voltage and low voltage domains and equipped with elaborate intrinsic diagnostic and online testing features for circuit protection and operation securing purposes, comprising the following means: a means for control of said firing, said diagnostic and said online testing; a means for said high-side switching of said squib to said power source; a means for said low-side switching of said squib to said circuit ground; a means for said high voltage domain power supply; a means for said low voltage domain power supply; a means for secured supply of electrical energy to said means for said high-side switching derived from said high voltage domain; a means for secured supply of electrical energy to said means for said low-side switching derived from said low voltage domain; a means for driving said high-side switching means for said squib controlled by said means for control of firing, diagnostic and online testing and supplying drive current to said high-side switching means either for the case of said diagnostic and online testing operations or for the case of said firing operation; and a means for connecting said high-side switching means and said low-side switching means to said means for control of firing, diagnostic and online testing in order to execute said diagnostic measurement and online testing whereby in said case of diagnostic and online testing operations a switchable and controllable current flow is initiated in conjunction with appropriate voltage measurements and resistance evaluations thereby strictly observing that no firing condition for said squib are allowed to occur and whereby in said case of firing operation a secure firing of said squib is always guaranteed.

BRIEF DESCRIPTION OF THE DRAWINGS

In the accompanying drawings forming a material part of this description, the details of the invention are shown.

DESCRIPTION OF THE PREFERRED EMBODIMENTS

The preferred embodiments disclose a novel optimized circuit conception for a squib driver using modern integrated digital circuits and an exemplary circuit thereto.

The approach for driving squibs within SIR systems implemented here is to some extent already known and has therefore been described in detail in the prior art description section above. Its in-depth comprehension is indeed a prerequisite for the understanding of the following new circuit approaches and design principles.

Important and valid are the respective automotive industry regulations, which do not allow during normal operation of the vehicle for a direct galvanic connection of the squib to either of the both voltages—neither to the Airbag Voltage Supply (AVS) voltage nor to GND voltage—or a closed FET switch contacting at the same time of both low resistance switches together; normal operation signifying thereby not firing the squib. Therefore standard design includes two separate switches on every side of a squib in a "vice-versa locking" operation mode, which is also effective in every possible testing situation. This means one high-side switch connects the squib to AVS voltage and another low-side switch connects the squib to GND voltage, thus the deployment of a squib is only initiated if these two independent switches of the firing loop are closed; the firing loop formed by the vehicle battery between AVS and GND on one side and with said high-side switch, said squib to be fired and said low-side switch on the other side.

Currently said squib driver switches are implemented using NPN, NMOS or DMOS transistors, which are controlled as semiconductor switches by appropriate driver circuits. Due to variations in the squib resistance from normally about 2 Ohms the current through the switches may vary between approximately 2 A and 4.5 A. For integrated squib power transistor switches the current flowing through these semiconductor switching devices must be limited to approximately 3 A, and by reducing this current to a safe but nevertheless reliable minimum with respect to firing the squib, the needed external energy storage capacitance $C_{store}$ can also be reduced in size, which is very important for economizing the overall system costs. Therefore however this current has to be measured and controlled during said firing operation and the transistors must be forced to reduce their on-resistance to avoid excessive power dissipation, which could lead to a premature destruction of said switching devices. The current practice of sensing this current with resistors causes an additional voltage drop that in consequence enlarges the unwanted power dissipation within the integrated power circuit. This disadvantage poses a major problem for these sorts of circuits.

Another important consequence of the aforementioned requirements by the automotive industry is a virtually incessant measuring of the isolation of the squib against AVS and GND, and also a quasi permanent determination of the squib resistance, which has to be performed during normal operation of the vehicle and can be appropriately solved by using periodically cycling measurement methods. Occurring faults can therefore be recognized almost immediately and will be signalized to the operator and/or be processed adequately by the security system of the vehicle. When performing electrical testing involving the squibs, care must be taken to avoid application of any current to a squib that could cause an inadvertent deployment of the airbag. Due to the cost of replacing an airbag module and the loss of supplemental protection until replacement occurs, diagnostic monitoring should not increase the chances of an inadvertent deployment. Therefore a very desirable test to be able to perform is a driver circuit test in which a squib driver circuit can be activated in a test mode without igniting the squib. Such a test has to verify that said semiconductor switches in series with the squib element itself would conduct as intended during an actual deployment event. However, such a test is problematic since the activation of each of these switches partially completes the deployment circuit. If certain other faults exist, or if the switch activation is not implemented properly, unintended deployments could occur. In a squib activating driver device for a passenger protection system in a vehicle an erroneous activating operation caused by improper operation of a microprocessor or any other component—or caused even by electrical noise—has to be prevented although electronic semiconductor switches are used to operate the squib.

Figure 2:
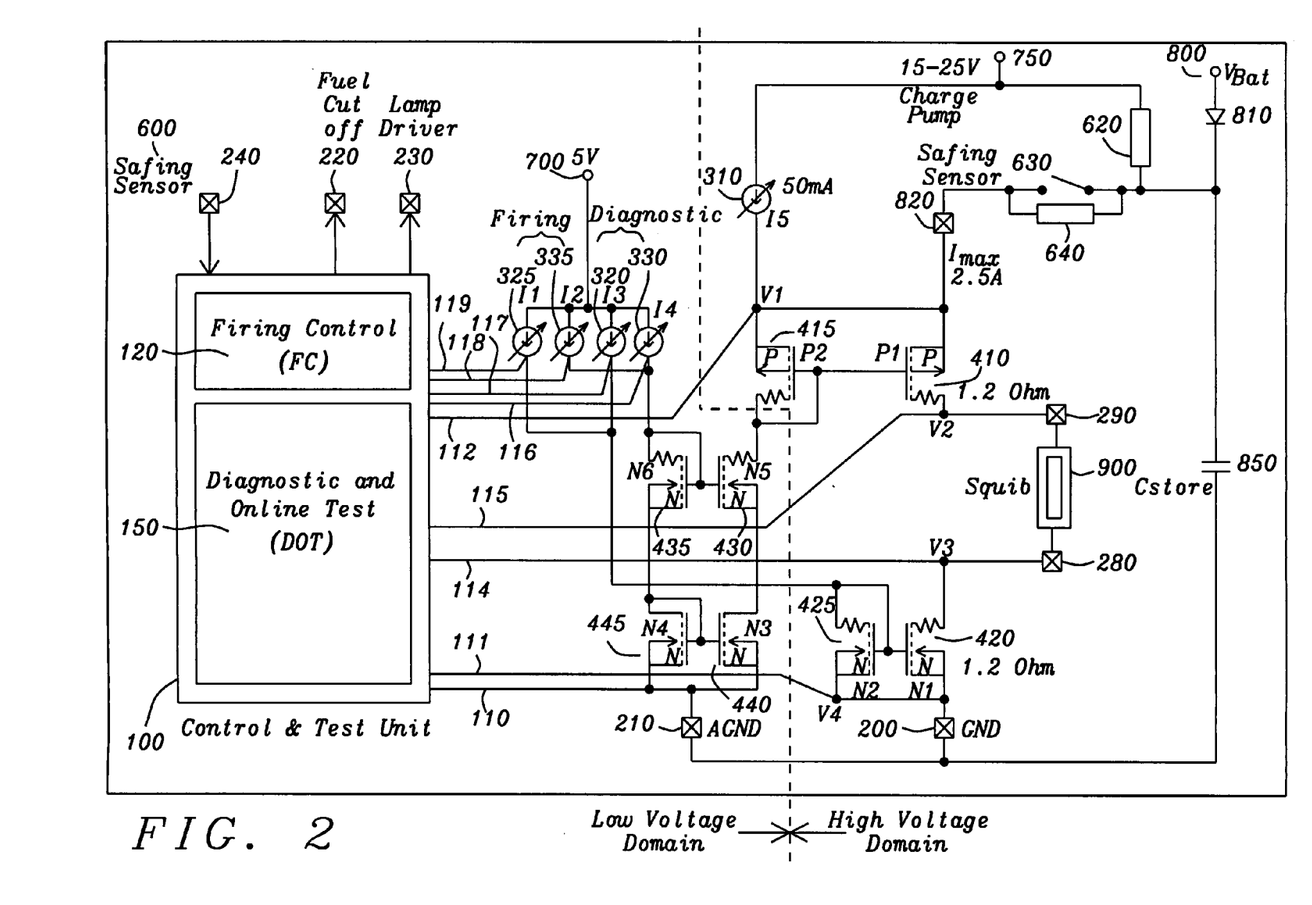
FIG. 2 shows the essential components for the preferred embodiment of the present invention i.e. a circuit diagram of the complete squib driver arrangement. The circuit diagram illustrates the essential circuit blocks—among other things the firing control and diagnostic testing circuit, several controllable current sources which are supplying current mirrors, and FET current mirror switching devices—a novelty as used here—together with the squib and its interconnections, all realizable with a variety of modern monolithic integrated-circuit technologies.
Figure 3A:
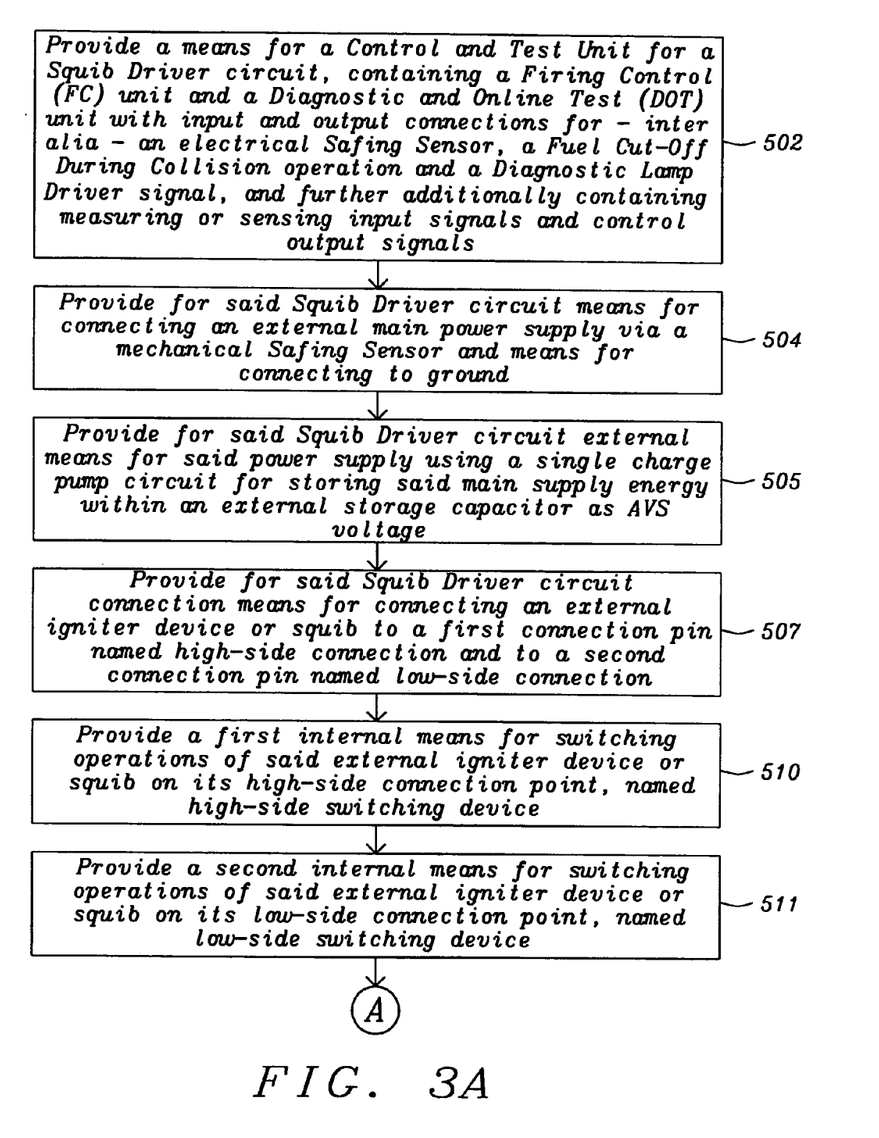
FIGS. 3A–3D describe with the help of a flow diagram the method for operating a squib driver implemented using an electrical circuit as shown in FIG. 2 for example.
Figure 3B:
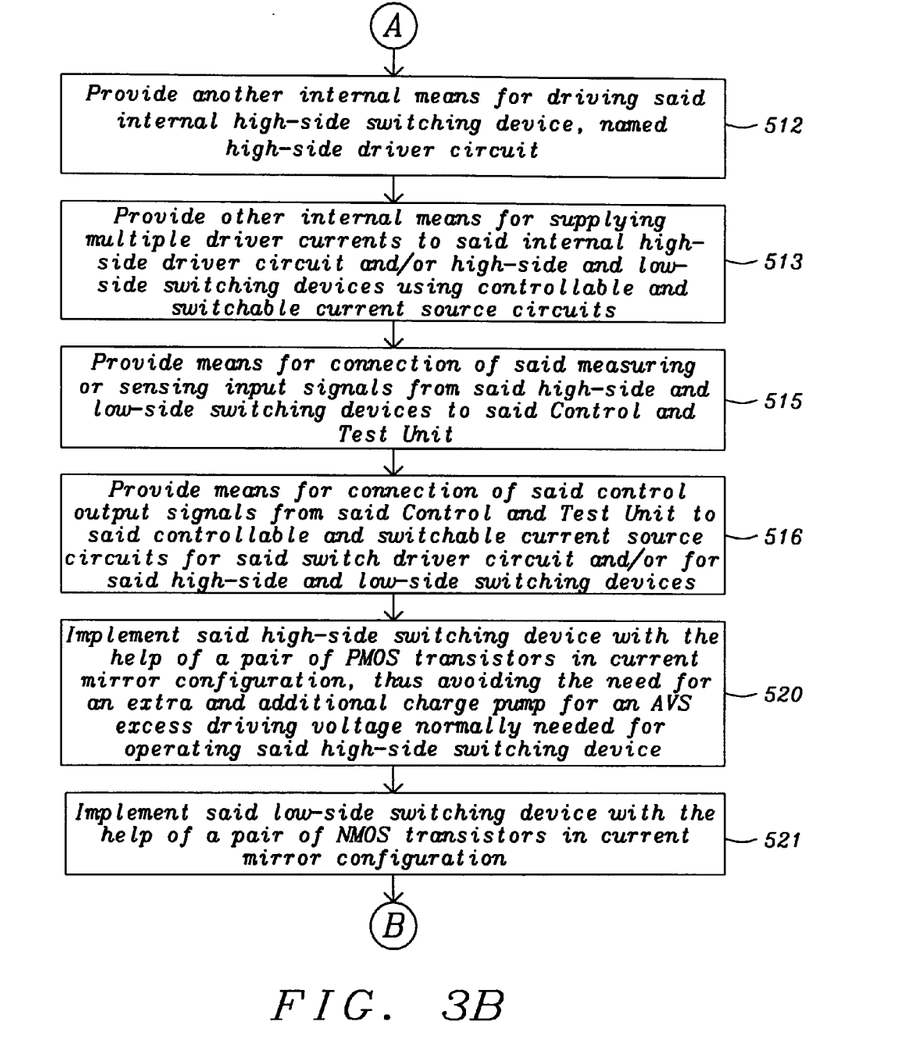
Figure 3C:
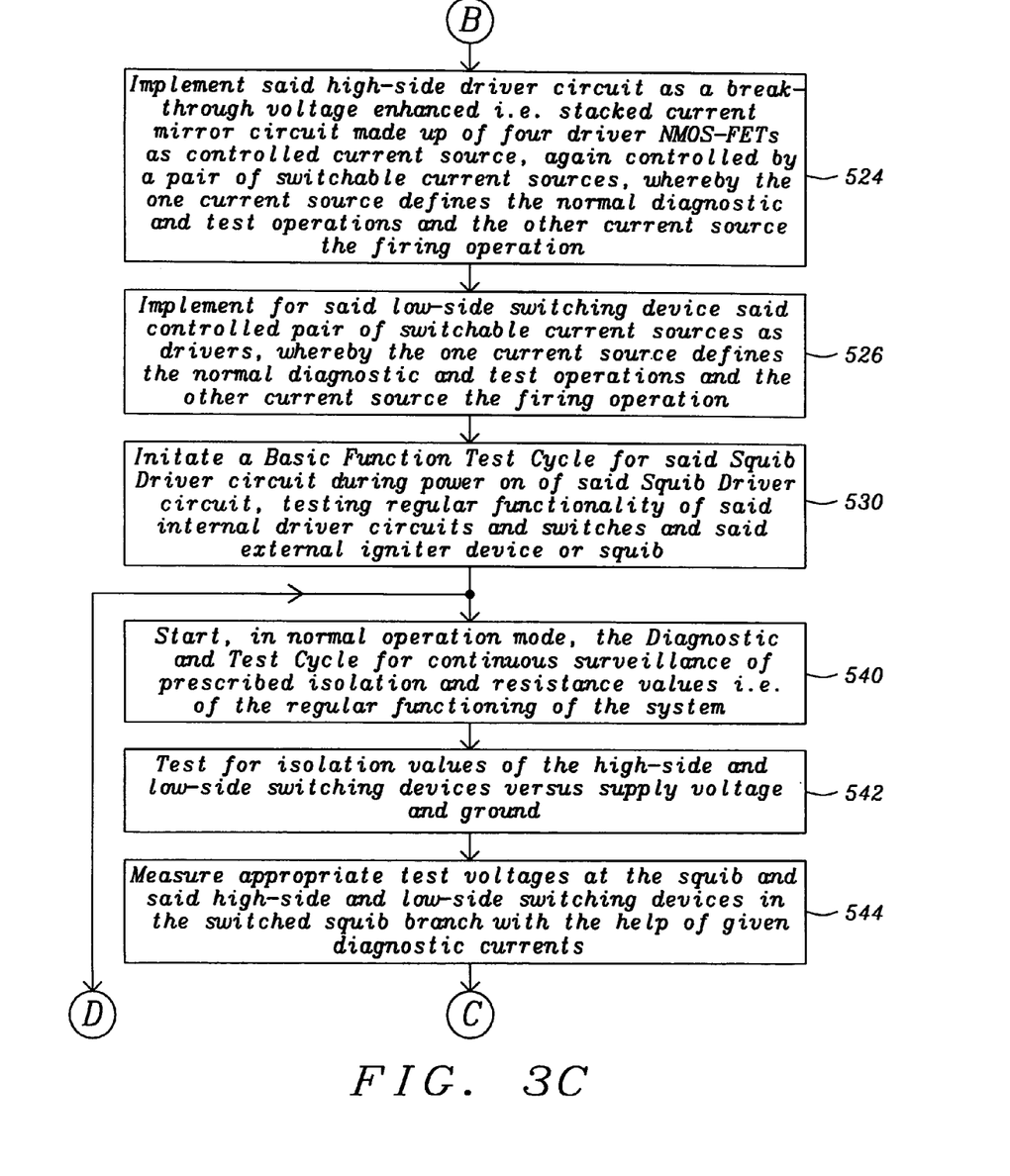
Figure 3D:
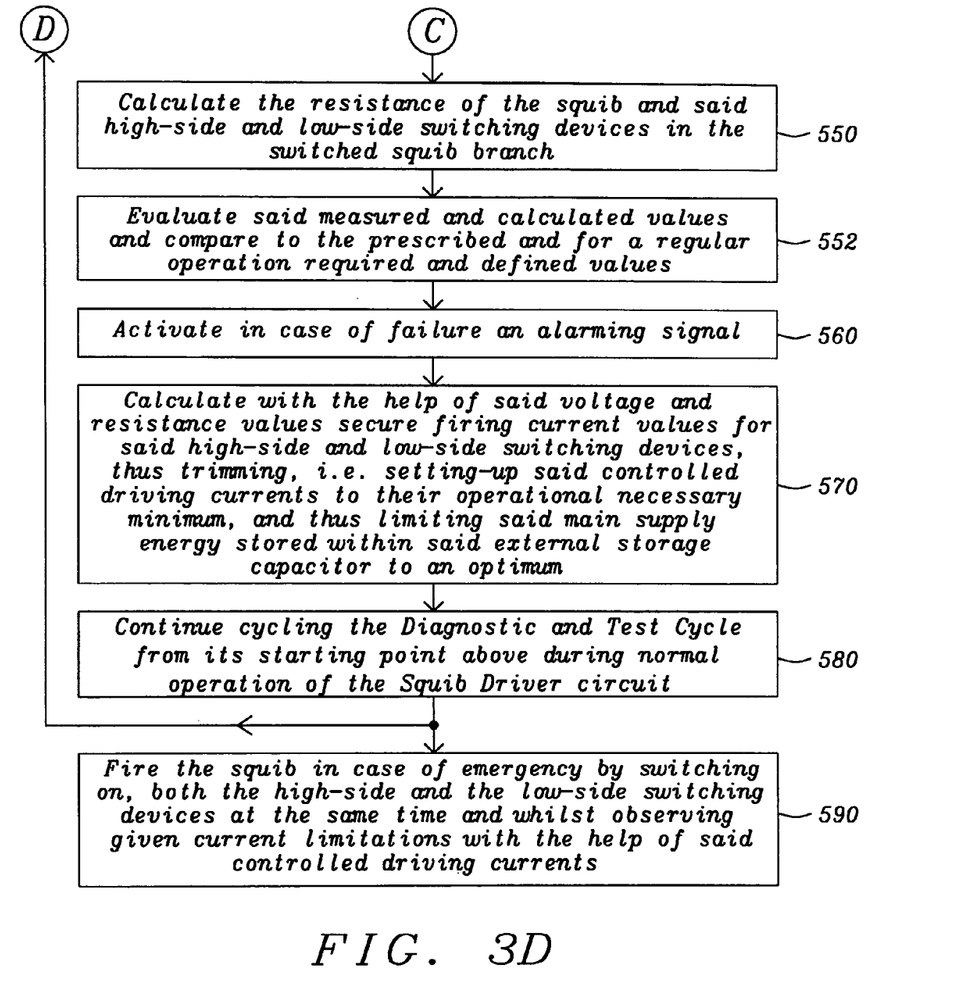

Referring now to FIG. 2, the preferred embodiment of the circuit diagram implementing the complete squib driver arrangement of the present invention is illustrated. The essential functional components comprise the Firing Control 120 (FC) and Diagnostic & Online Testing 150 (DOT) circuit within control and test unit 100, all the input, output and ground pins of the circuit (items 200 . . . 290), the igniter or squib (item 900), diverse current sources for driver switch diagnostics and firing $I_1$, $I_2$, $I_3$, $I_4$ and $I_5$ (items 325, 335, 320, 330, and 310), one pair of high-side driver PMOS-FETs $P_1$ and $P_2$ (items 410 and 415) in current mirror configuration and serving as high-side switching device (via $P_1$, 410) with a primary current mirror for squib 900 and driven by a—break-through voltage enhanced i.e. stacked—secondary current mirror circuit made up of four driver NMOS-FETs $N_3$, $N_4$, $N_5$ and $N_6$ (items 430, 435, 440 and 445) as controllable current source for said high-side switching device $P_1$ and $P_2$ (items 410 and 415) as said primary current mirror. One pair of low-side driver NMOS-FETs $N_1$ and $N_2$ (items 420 and 425) in current mirror configuration are then serving as low-side switching device (via $N_1$, 420) for squib 900. Also depicted are several external power supplying components being an input from a low voltage source (item 700) or being an input from a charge pump (item 750) with the extra energy storing capacitor $C_{store}$ (item 850) serving as storage load for this charge pump whereby the charge pump voltage $V_{cpAVS}$ (for item 750) as seen over $C_{store}$ (850) is always the main power supply source of the airbag application. This extra energy storage is especially of importance through its boosting and buffering in an emergency case, when the battery of the vehicle is not working any more i.e. not delivering enough power for secure ignition of the squib in case of an accident. Also shown is the power input voltage $V_{Bat}$ via connector from the vehicle battery 800 together with its reverse battery protection diode 810, whereby this voltage $V_{Bat}$ is initially charging said capacitor $C_{store}$ (850) during the power-up sequence. After this the charge pump 750 is charging this connection node 820 (diode 810-capacitor 850) up to a voltage of 15–25 V and thus disconnecting $V_{Bat}$ by said diode 810 from said node 820, now delivering the Airbag Voltage Supply (AVS) voltage. Further shown are the safing sensor components for either electrical 600 (input pin 240) or mechanical type (items 620, 630 and 640) devices. With the depicted four controllable current sources $I_1$ (325), $I_2$ (335), $I_3$ (320), and $I_4$ (330) the control of the relevant current mirror circuits is managed, whereby $I_1$ and $I_2$ are used for the firing operations, and $I_3$ and $I_4$ for the diagnosis of the squib. The control signals are generated within the control and test unit 100, control signal lines 116 and 117 used for said diagnostics and control signal lines 118 and 119 used for said firing.

Summarizing the essential operational features of the circuit we find, that the squib driver circuit contains a high-side PMOS-FET switch $P_1$ (410) which connects one connector pin of the squib (900) to the Airbag Voltage Supply (AVS) 820 and a low side NMOS-FET switch $N_1$ (420) which connects the second connector pin of the squib (900) to GND (200). The regular resistance value of the squib (900) is about 2 Ohm. At normal operation of the vehicle (i.e. not firing the squib) the squib is not allowed to have a connection neither to AVS (820) nor to GND (200). Therefore regularly measuring during normal operation the isolation values of the squib (900) vs. AVS (820) and vs. GND (200) is a requirement. The healthy condition of the squib (900) is additionally supervised by regularly measuring the resistance of the squib (900). The diagnostic current values during these diagnostic measurements must be limited to currents lying in the range of 50 mA sufficiently far away from the values of the firing current. The current value for firing the squib (900) must be supplied with values round about 2 A. Having the squib fired by said low-side current mirror $N_1$–$N_2$ (420–425; operating as a closing FET switch) with FET switch $N_1$ (420) closed and said high-side current mirror $P_1$–$P_2$ (410–415; operating as a closing FET switch) with FET switch $P_1$ (410) closed, all operating in the AVS voltage (15–25 V; max. 40 V) domain, all the diagnostic operations for these FET switching devices (410–415 and 420–425) and for the squib (900) can be controlled and measured by control signals completely derived from the 5 V (or 3.3 V) or low-voltage domain, only the squib branch being supplied from the AVS or high-voltage domain; thus easily fulfilling the operational demands established by security requirements.

Still with the help of FIG. 2 looking now somewhat closer to the diagnostic functions of the circuit of the invention during normal operation, we find that in diagnostic mode for the squib (900), which is controlled by the DOT circuit block (150), the squib (900) is powered by the AVS voltage $V_{cpAVS}$ (750) with a maximum current limited to 50 mA. The voltage sensing signals measured are $V_1$, $V_2$, $V_3$, and $V_4$ fed into the DOT (150) circuit by lines 112, 115, 114 and 111, referenced to GND 110. Switching on the switch FET $P_1$ (410) with a limited current from the source $I_3$ (320), the two voltages $V_1$ (112) and $V_2$ (115), and thus the voltage drop $V_1/V_2$ can be measured. With this a short to GND can be detected. In case of a short the squib (900) cannot be fired because the measurement current is limited and too small for firing the squib (900). Switching on the current mirror FET $N_1$ (420) with a limited current from the source $I_4$ (330), the voltage drop $V_3/V_4$ (114/111) can be measured. With this a short to AVS can be detected. In case of a short again the squib (900) cannot be fired because the measurement current is limited and too small for firing the squib (900). Activating the current source FET $N_1$ (420) and the switch FET $P_1$ (410), the voltage drop $V_2/V_3$ (115/114) of the squib and the serial resistance of the squib can be measured. In this case the current $I_5$ controlling $P_1$ is limited anyhow to 50 mA, therefore the diagnostic current $I_3$ can only be smaller or equal to 50 mA.

Describing now the safing operation of the circuit of the invention—i.e. the safing sensor switch (630) closed and firing the squib (900)—implies that current source $I_1$ (325) controlled by the firing control signal (119) from circuit block FC (120) injects a defined current to the current mirror $N_2$–$N_1$ (425–420). So $N_1$ (420) will connect the lower side of the squib (900) to GND unless the current exceeds the maximum mirrored current. Current source $I_2$ (335), now controlled by the firing control signal (118) from circuit block FC (120) injects a defined current to the pair of current mirrors $N_6$–$N_5$ (435–430) and $N_4$-$N_3$ (445–440). This current is again mirrored versus $P_2$–$P_1$ (415–410), so FET $P_1$ will connect the higher side of the squib to AVS voltage unless the current exceeds the maximum mirrored current. The minimum firing current for the squib is about 1.8 A. Trimming and limiting the current through $P_1$ (410) and also through $N_1$ (420) to 2.5A–3 A is important in order not to overheat the ASIC and therefore not to melt the bond wires of the package. The minimum supply voltage for firing the squib can also be reduced by this provision. Implementing the primary high-side switching device as a PMOS current mirror ($P_1$–$P_2$; 410–415) avoids the necessity to generate a voltage, which is higher as the AVS voltage thus getting around of employing another additional charge pump.

In case of emergency during a car accident, i.e. when the battery of the vehicle may be already out of order, the energy already pumped by said charge pump into capacitor $C_{store}$ (850) during normal operations and stored within said capacitor as AVS voltage $V_{cpAVS}$ has to be sufficient for said firing of the squib (900) and to supply the needed driver circuit parts with energy for the triggering during said safing operation. Said aforementioned trimming and limiting of the maximum squib current has another advantage: the capacitance value of capacitor $C_{store}$ (850) can be kept as small as possible, thus allowing to assemble the system with cheaper capacitor components, these normally being expensive parts of the system.

Referring now to FIGS. 3A–3D, the method for operating a squib driver circuit implemented using electrical circuit schematics as shown for example in FIG. 2 is described in some detail with the help of a flow diagram for every essential step.

Steps 502 to 516 list all the necessary means for the implementation of said method, whereby the first step 502 provides a means for a Control and Test Unit for a Squib Driver circuit, containing a Firing Control (FC) unit and a Diagnostic and Online Test (DOT) unit with input and output connections for—inter alia—an electrical Safing Sensor, a Fuel Cut-Off During Collision operation and a Diagnostic Lamp Driver signal, and further additionally containing measuring or sensing input signals and control output signals and step 504 provides for said Squib Driver circuit means for connecting an external main power supply via a mechanical Safing Sensor and means for connecting to ground, in step 505 for said Squib Driver circuit external means are provided for said power supply using a single charge pump circuit for storing said main supply energy within an external storage capacitor as AVS voltage. Step 507 further provides for said Squib Driver circuit connection means for connecting an external igniter device or squib to a first connection pin named high-side connection and to a second connection pin named low-side connection and steps 510 and 511 provide a first internal means for switching operations of said external igniter device or squib on its high-side connection point, named high-side switching device and a second internal means for switching operations of said external igniter device or squib on its low-side connection point, named low-side switching device. With step 512 and step 513 another internal means for driving said internal high-side switching device, named high-side driver circuit and again another internal means for supplying multiple driver currents to said internal high-side driver circuit and/or high-side and low-side switching devices using controllable and switchable current source circuits are provided. Step 515 provides means for connecting of said measuring or sensing input signals from said high-side and low-side switching devices to said Control and Test Unit and finally step 516 provides means for connecting of said control output signals from said Control and Test Unit to said controllable and switchable current source circuits for said switch driver circuit and/or for said high-side and low-side switching devices.

Starting with step 520 the implementation of said high-side switching device with the help of a pair of PMOS transistors in current mirror configuration is described, thus avoiding the need for an extra and additional charge pump for an AVS excess driving voltage normally needed for said high-side switching device, in step 521 implementing said low-side switching device with the help of a pair of NMOS transistors in current mirror configuration follows, together with step 524 implementing said high-side driver circuit as a break-through voltage enhanced i.e. stacked—current mirror circuit made up of four driver NMOS-FETs as controlled current source, again controlled by a pair of switchable current sources, whereby the one current source defines the normal diagnostic and test operations and the other current source the firing operation, and step 526 implementing for said low-side switching device said controlled pair of switchable current sources as drivers, whereby the one current source defines the normal diagnostic and test operations and the other current source the firing operation.

In step 530 the normal operation of the circuit begins by initiating a Basic Function Test Cycle for said Squib Driver circuit during power on of said Squib Driver circuit, testing regular functionality of said internal driver circuits and switches and said external igniter device or squib, and step 540 starts, still in normal operation mode, the Diagnostic and Test Cycle for continuous surveillance of prescribed isolation and resistance values i.e. of the regular functioning of the system. With step 542 a test for isolation values of the high-side and low-side switching devices versus supply voltage and ground is made, then step 544 measures appropriate test voltages at the squib and said high-side and low-side switching devices in the switched squib branch with the help of given diagnostic currents, step 550 then calculates the resistance of the squib and said high-side and low-side switching devices in the switched squib branch, and in step 552 the evaluation of said measured and calculated values and comparison to the prescribed and for a regular operation required and defined values is made, activating in case of failure an alarming signal at step 560, all these are steps in normal operation mode. Another normal mode step 570 calculates with the help of said voltage and resistance values secure firing current values for said high-side and low-side switching devices, thus trimming, i.e. setting-up said controlled driving currents to their operational necessary minimum, and thus limiting said main supply energy stored within said external storage capacitor to an optimum and so continuing the Diagnostic and Test Cycle from its starting point above during normal operation of the Squib Driver circuit during step 580. Normal operation ends with step 590, firing the squib in case of emergency by switching on, both the high-side and the low-side switching devices at the same time and whilst observing given current limitations with the help of said controlled driving currents.

As shown in the preferred embodiment and evaluated by circuit analysis, the novel circuit and method provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A circuit, realizing a driver device for secure and reliable firing of an igniter or squib, connecting said squib via a high-side electronic switch to a power source and via a low-side electronic switch to circuit ground, incorporating separate power supply parts for high voltage and low voltage domains and equipped with elaborate intrinsic diagnostics and online testing features for circuit protection and operation securing purposes, comprising:
    a means for control of said firing, said diagnostics, and said online testing having a safing sensor signal input pin, four pins for voltage sense input signals, four pins for two pairs of current control output signals, and a ground pin;
    a means for said high-side switching of said squib to said power source performing high-side switching transistor functions for said firing, for said diagnostics, and for said online testing;
    a means for said low-side switching of said squib to said circuit ground performing low-side switching transistor functions for said firing, for said diagnostics, and for said online testing;
    a means for providing said high voltage domain power supply;
    a means for providing said low voltage domain power supply;
    a means for secured supply of electrical energy to said means for said high-side switching derived from said high voltage domain;
    a means for steered supply of currents to said means for said low-side switching derived from said low voltage domain and controlled by one pair of said current control output signals;
    a means for steered supply of currents to a means for driving said high-side switching means derived from said low voltage domain and controlled by the other pair of said current control output signals;
    a means for driving said high-side switching means for said squib controlled by said means for control of firing, diagnostic and online testing and supplying drive current to said high-side switching means either for the case of said diagnostic and online testing operations or for the case of said firing operation; and
    a means for connecting said high-side switching means and said low-side switching means to said means for control of firing, diagnostic and online testing in order to execute said diagnostic measurement and online testing by said four voltage sense input signals whereby in said case of diagnostic and online testing operations a switchable and controllable current flow is initiated in conjunction with appropriate voltage measurements and resistance evaluations thereby strictly observing that no firing condition for said squib is allowed to occur and whereby in case of said firing operation a secure firing of said squib is always guaranteed.

2. The circuit according to claim 1 wherein said means for said high-side switching of said squib to said power source connects to one side of said squib and said means for said low-side switching of said squib to said circuit ground connects to the other side of said squib, thus forming a switchable squib firing branch between said power source and said circuit ground.

3. The circuit according to claim 1 wherein said means for control of said firing, said diagnostic and said online testing is subdivided into a means for control of said firing and a means for said diagnostic and online testing.

4. The circuit according to claim 1 wherein said means for said high-side switching of said squib to said power source is realized as a controllable electronic switch in current mirror configuration.

5. The circuit according to claim 4 wherein said current mirror configuration is driven by voltages not exceeding the high-voltage domain supply voltage, thus eliminating the need for an external and additional charge pump.

6. The circuit according to claim 4 wherein said current mirror configuration is implemented using Field Effect Transistors (FETs).

7. The circuit according to claim 6 wherein said FETs are of the PMOS type manufactured in CMOS technology.

8. The circuit according to claim 7 wherein said FETs of the PMOS type and manufactured in CMOS technology are driven by voltages not exceeding the high-voltage domain supply voltage, thus eliminating the need for an external and additional charge pump.

9. The circuit according to claim 1 wherein said means for said low-side switching of said squib to said circuit ground is implemented using a controllable electronic switch in current mirror configuration.

10. The circuit according to claim 9 wherein said current mirror configuration is set up using Field Effect Transistors (FETs).

11. The circuit according to claim 10 wherein said FETs are of the NMOS type manufactured in CMOS technology.

12. The circuit according to claim 1 wherein said means for providing said high voltage domain power supply include generators and batteries from a vehicle as primary source with a voltage range of 15 V to 40 V, and derived there-from separate secondary power sources implemented as charge pump devices operating in the same voltage range as said primary source.

13. The circuit according to claim 12 wherein said means for providing said high voltage domain power supply also includes a controlled current source for said high-side switching device.

14. The circuit according to claim 1 wherein said means for providing said low voltage domain power supply consist of separate power sources derived from generators and batteries from a vehicle as primary source with a voltage range of 15 V to 40 V and operating within a reduced low voltage range of 3.3 V to 5 V.

15. The circuit according to claim 14 wherein said means for providing low voltage domain power supply also includes controlled current sources.

16. The circuit according to claim 1 wherein said means for secured supply of electrical energy to said means for said high-side switching derived from said high voltage domain consists of a charge pump feeding a controlled current source.

17. The circuit according to claim 1 wherein said means for steered supply of currents-to said low-side switching means derived from said low voltage domain consists of one pair of controlled current sources fed by voltages out of said low voltage domain for controlled current switching between different currents for current limiting and diagnostic testing purposes respectively.

18. The circuit according to claim 17 wherein one current source of said pair of controlled current sources is used in case of said diagnostic and online testing operations and the other current source is used in case of said firing operation and each current source is being controlled by a separate case related current control input and whereby as current output from said pair of controlled current sources one common output is formed.

19. The circuit according to claim 1 wherein said means for driving said high-side switching means for said squib consists of a stacked current mirror circuit made up of four FETs serving as current source for said high-side switching device circuit implemented in CMOS technology.

20. The circuit according to claim 1 wherein said means for connecting said high-side switching means and said low-side switching means to said means for control of firing, diagnostic and online testing comprises on one hand output control signal lines leading to said means for driving said high-side switching means and leading to said means for secured supply of electrical energy to said means for said low-side switching derived from said low voltage domain and on the other hand input measurement signal lines from said high-side switching means of said squib and from said low-side switching means, as well as power supply and ground connections.

21. The circuit, according to claim 1 whereby into said means for said high-side switching of said squib to said power source are combined together: firstly said high-side switching transistor functions for controlled firing operation and for onsite test diagnostics, secondly said controlled firing operation with current limitation and thirdly said onsite test diagnostics.

22. The circuit, according to claim 1 whereby into said means for said low-side switching of said squib to said circuit ground are combined together: firstly said low-side switching transistor functions for controlled firing operation and for onsite test diagnostics, secondly said controlled firing operation with current limitation and thirdly said onsite test diagnostics.

23. The circuit according to claim 1 wherein said means for steered supply of currents to a means for driving said high-side switching means derived from said low voltage domain consists of one pair of controlled current sources fed by voltages out of said low voltage domain for controlled current switching between different currents for current limiting and diagnostic testing purposes respectively.

24. The circuit according to claim 23 wherein one current source of said pair of controlled current sources is used in case of said diagnostic and online testing operations and the other current source is used in case of said firing operation and each current source is being controlled by a separate case related current control input and whereby as current output from said pair of controlled current sources one common output is formed.

25. A circuit, realizing a driver device for secure and reliable firing of an igniter or squib, connecting said squib via an electronic high-side switch to a power source and via an electronic low-side switch to circuit ground, incorporating separate power supply parts for high voltage and low voltage domains and equipped with elaborate intrinsic diagnostic and online testing features for a diagnostics and a firing mode for circuit protection and firing operation securing purposes, comprising:
  a control and test unit subdivided into a Firing Control (FC) part and a Diagnostic & Online Testing (DOT) part with two pairs of current control outputs for said diagnostics and said firing mode and each for said high-side and said low-side switch respectively;
  two output terminal pins for external connecting the igniter or squib to said circuit;
  a first controllable electronic switch, namely said high-side switch, connecting to one side of said squib and allowing for connecting said squib to said power source for safely performing driver switch diagnostics and a driver switch operation of secure firing when simultaneously closed with said low-side switch;
  a second controllable electronic switch, namely said low-side switch, connecting to the other side of said squib and allowing for connecting said squib to circuit ground for safely performing said driver switch diagnostics and said driver switch operation of secure firing when simultaneously closed with said high-side switch;
  one input connector pin for connecting an external mechanical safing sensor to said driver device fed by a charge pump which in turn is fed by said power source, which itself is also connected and reverse battery protected by a series power diode and thus serving as main power input terminal and therefore connected to one side of said high-side switch;
  one input connector pin for connecting an electronic safing sensor to said control and test unit of said driver device;
  one output connector pin for a 'Fuel Cut-Off' signal generated within said Firing Control (FC) part of said control and test unit in case of a firing operation;
  one output connector pin for a 'Diagnostic Lamp Driver' signal generated within said Diagnostic & Online Testing (DOT) part of said control and test unit in case of a failure detection during normal operation of the circuit;
  one first ground pin of the circuit wired to said low-side switch,
  one second ground pin of the circuit wired to said first ground pin and to said control and test unit,
  a first controlled current source with a diagnostics current control input for driver switch diagnostics of said high-side switch and switching on in current limited diagnostic mode performing high-side switching transistor functions for diagnostics;

a second controlled current source with a firing current control input for driver switch operation of firing or said high-side switch and switching on in current limited firing mode performing high-side switching transistor functions for firing;

one high-side current output connecting the current outputs of said first and said second controlled current source as common input to said high-side switch;

a third controlled current source with a diagnostics current control input for said driver switch diagnostics of said low-side switch and switching on in said current limited diagnostic mode performing low-side switching transistor functions for diagnostics;

a fourth controlled current source with a firing current control input for said driver switch operation of firing said low-side switch and switching on in said current limited firing mode performing low-side switching transistor functions for firing;

one low-side current output connecting the current outputs of said third and said fourth controlled current source as common input to said low-side switch;

one external power supplying component receiving input from said separate power supply part out of said low voltage domain;

one external power supplying component working as charge pump fed by said separate power supply part from said high voltage domain and feeding in diagnostics mode said first controllable electronic switching device, realized as current mirror and as well feeding an external energy storing device, realized as storage capacitor;

one break-through voltage enhanced, stacked current mirror circuit made up of four FETs serving as current source for said high-side switching device;

one external power supplying component working as charge pump fed by said separate power supply part from said high voltage domain and feeding said high-side current mirror;

two tow-side control signal lines from said current control outputs fed by said control and test unit steering said controlled current source for said driver switch diagnostics and steering said controlled current source for said driver switch operation of firing, both current sources used for said low-side switch;

two control signal lines from said current control outputs fed by said control and test unit steering said controlled current source for said driver switch diagnostics and steering said controlled current source for said driver switch operation of secure firing, both current sources used for said high-side switch; and four sense signal lines sensing the voltage levels on both sides of said two controllable electronic switches and feeding their signals into said control and test unit in both operating cases: said diagnostic mode and said firing mode.

26. The circuit according to claim 25 wherein said first controllable electronic switching device, named high-side switch is realized by a PMOS-FET current mirror circuit.

27. The circuit according to claim 26 wherein said high-side switch realized by a PMOS-FET current mirror circuit is driven by voltages not exceeding the high-voltage domain supply voltage, thus eliminating the need for an external and additional charge pump.

28. The circuit according to claim 25 wherein said first controllable electronic switching device, named high-side switch is realized by a PMOS-FET current mirror circuit and driven by said stacked current mirror circuit made up of four driver FETs serving as current source for said high-side switching device.

29. The circuit according to claim 28 wherein said PMOS-FET current mirror circuit driven by said stacked current mirror circuit made up of four driver FETs serving as current source for said high-side switching device are all fed by voltages not exceeding the high-voltage domain supply voltage, thus eliminating the need for an external and additional charge pump.

30. The circuit, according to claim 25 wherein second controllable electronic switch, named low-side switch is implemented by two low-side driver NMOS-FETs in current mirror configuration and thus serving as said low-side driver switch.

31. The circuit, according to claim 25 whereby into said high-side switching device of said squib to said power source are combined together: firstly said high-side switching transistor functions for controlled firing operation and for onsite test diagnostics, secondly said controlled firing operation with current limitation and thirdly said onsite test diagnostics.

32. The circuit, according to claim 25 whereby into said low-side switching device of said squib to said circuit ground are combined together: firstly said low-side switching transistor functions for controlled firing operation and for onsite test diagnostics, secondly said controlled firing operation with current limitation and thirdly said onsite test diagnostics.

33. The circuit, according to claim 25 implemented with said controlled current source for said driver switch operation of firing for said high-side switch and with said controllable current source for said low-side switch, both trimmed and setup in such a way, that the control currents for said current sources are reduced to a safe minimum for a secure firing operation, thus allowing for the smallest external storage capacitor possible.

34. The circuit, according to claim 25 implemented as integrated circuit.

35. The circuit, according to claim 25 implemented as integrated circuit in low cost CMOS technology.

36. A method for controlled operation and secure firing of igniters or squibs, capable of driving the necessary switching devices within a circuit branch connecting said squib via a high-side electronic switch to a power source and via a low-side electronic switch to circuit ground, incorporating separate power supply parts for high voltage and low voltage domains and equipped with elaborate intrinsic diagnostic and online testing features for circuit protection and operation securing purposes, altogether named Squib Driver circuit, comprising:

providing a means for providing a Control and Test Unit for said Squib Driver circuit, containing a Firing Control (FC) unit and a Diagnostic and Online Test (DOT) unit with input and output connections for an electrical Safing Sensor, a Fuel Cut-Off During Collision operation and a Diagnostic Lamp Driver signal, and further additionally containing measuring or sensing input signals and control output signals;

providing for said Squib Driver circuit means for connecting an external main power supply via a mechanical Safing Sensor and means for connecting to ground;

providing for said Squib Driver circuit external means for providing said power supply using a single charge pump circuit for storing said main supply energy within an external storage capacitor as Airbag Voltage Supply (AVS) voltage;

providing for said Squib Driver circuit connection means for connecting an external igniter device or squib to a first connection pin named high-side connection and to a second connection pin named low-side connection;

providing a first internal means for switching operations of said external igniter device or squib on its high-side connection point, named high-side switching device;

providing a second internal means for switching operations of said external igniter device or squib on its low-side connection point, named low-side switching device;

providing another internal means for driving said internal high-side switching device, named high-side driver circuit;

providing other internal means for supplying multiple driver currents to said internal high-side driver circuit and/or high-side and low-side switching devices using controllable and switchable current source circuits;

providing means for connection of said measuring or sensing input signals from said high-side and low-side switching devices to said Control and Test Unit;

providing means for connection of said control output signals from said Control and Test Unit to said controllable and switchable current source circuits for said switch driver circuit and/or for said high-side and low-side switching devices;

implementing said high-side switching device with at least a pair of PMOS transistors in current mirror configuration, thus avoiding the need for an extra and additional charge pump for an AVS excess driving voltage normally needed for operating said high-side switching device;

implementing said low-side switching device with at least a pair of NMOS transistors in current mirror configuration;

implementing said high-side driver circuit as a breakthrough voltage enhanced, stacked current mirror circuit made up of four driver NMOS-FETs as controlled current source, again controlled by a pair of switchable current sources, whereby the one current source defines the normal diagnostic and test operations and the other current source the firing operation;

implementing for said low-side switching device said controlled pair of switchable current sources as drivers, whereby the one current source defines the normal diagnostic and test operations and the other current source the firing operation;

initiating a Basic Function Test Cycle for said Squib Driver circuit during power on of said Squib Driver circuit, testing regular functionality of said internal driver circuits and switches and said external igniter device or squib;

starting, in normal operation mode, the Diagnostic and Test Cycle for continuous surveillance of prescribed isolation and resistance values i.e. of the regular functioning of the system;

testing for isolation values of the high-side and low-side switching devices versus supply voltage and ground;

measuring appropriate test voltages at the squib and said high-side and low-side switching devices in the switched squib branch with at least given diagnostic currents;

calculating the resistance of the squib and said high-side and low-side switching devices in the switched squib branch;

evaluating said measured and calculated values and compare to the prescribed and for a regular operation required and defined values;

activating in case of failure an alarming signal;

calculating with at least of said voltage and resistance values secure firing current values for said high-side and said low-side switching devices, thus trimming and setting-up said controlled driving currents to their operational necessary minimum, and thus limiting said main supply energy stored within said external storage capacitor to an optimum;

continuing the Diagnostic and Test Cycle from its starting point above during normal operation of the Squib Driver circuit; and firing the squib in case of emergency by switching on at the same time, both the high-side and the low-side switching devices and whilst observing given current limitations with at least of said controlled driving currents.

37. A circuit, realizing a driver device for secure and reliable firing of an igniter or squib, comprising:

an external power source delivering the main supply energy and as well feeding an external energy storing device, realized as a storage capacitor:

a high-side and a low-side switch, connecting said squib to said power source and to ground respectively and thus allowing safely performed diagnostics of switches and said squib and also guaranteeing a secure firing of said squib when simultaneously closed and whereby said high-side switch is implemented with the help of a pair of PMOS transistors and said low-side switch with at least a pair of NMOS transistors both in current mirror configuration;

a first controlled current source for diagnostics and thus enabling to switch on in a current limited diagnostic mode said high-side switch;

a second controlled current source for firing and thus enabling to switch on in a current controlled firing mode said high-side switch;

a third controlled current source for diagnostics and thus enabling to switch on in said current limited diagnostic mode said low-side switch;

a fourth controlled current source for firing and thus enabling to switch on in said current controlled firing mode said low-side switch; and a control circuit for diagnostics and firing of said squib capable of evaluating and setting-up the values of said controlled currents to their operational necessary minimum in such a way that a secure firing of said squib is always guaranteed and at the same time limiting said main supply energy stored within said external storage capacitor to an optimum.

38. A method for controlled operation and secure firing of igniters or squibs, comprising:

providing a power source delivering the main supply energy and external means for storing said main supply energy within an external storage capacitor;

providing a high-side and a low-side switching device, connecting said squib to said power source and to ground respectively and thus allowing safely performed diagnostics of switches and said squib and also guaranteeing a secure firing of said squib when simultaneously closed;

providing internal means for supplying multiple driver currents to high-side and said low-side switching devices using controllable and switchable current source circuits;

implementing said high-side switching device with at least a pair of PMOS transistors in current mirror configuration;

implementing said low-side switching device with at least a pair of NMOS transistors in current mirror configuration;

implementing for each of said high-side and said low-side switching devices a controlled pair of switchable current sources as drivers respectively, whereby in each pair one current source defines normal diagnostic and test operations and the other current source guarantees said secure firing; and calculating secure firing current values for said high-side and said low-side switching devices, thereby trimming and setting-up said controlled driving currents to their operational necessary minimum, and thus limiting said main supply energy stored within said external storage capacitor to an optimum.

* * * * *